United States Patent
Jeong

(10) Patent No.: US 9,415,312 B2
(45) Date of Patent: Aug. 16, 2016

(54) METHOD FOR IDENTIFYING A CLIENT'S REQUEST SIGNAL AT GAME BASED ON WEB

(71) Applicants: Masangsoft Inc., Seoul (KR); Gamebin Inc., Seongnam-Si (KR)

(72) Inventor: Chang Jin Jeong, Gunpo (KR)

(73) Assignees: MASANGSOFT INC., Seoul (KR); GAMEBIN INC., Seongnam-Si (KR)

(*) Notice: Subject to any disclaimer, the term of this patent is extended or adjusted under 35 U.S.C. 154(b) by 222 days.

(21) Appl. No.: 14/190,472

(22) Filed: Feb. 26, 2014

(65) Prior Publication Data

US 2015/0238865 A1    Aug. 27, 2015

(30) Foreign Application Priority Data

Feb. 24, 2014   (KR) .................. 10-2014-0021582

(51) Int. Cl.
  *A63F 13/73* (2014.01)
  *A63F 13/35* (2014.01)
  *H04L 29/06* (2006.01)

(52) U.S. Cl.
  CPC ............. *A63F 13/73* (2014.09); *A63F 13/35* (2014.09); *H04L 63/08* (2013.01); *H04L 63/108* (2013.01)

(58) Field of Classification Search
  USPC ........................................ 463/28, 29, 30, 31
  See application file for complete search history.

(56) References Cited

U.S. PATENT DOCUMENTS 7,895,311 B1*   2/2011  Juenger .................. 709/223
2012/0322549 A1* 12/2012  Kim .......................... 463/29

FOREIGN PATENT DOCUMENTS

KR   20130017337    2/2013
KR   20130106976   10/2013

* cited by examiner

*Primary Examiner* — Paul A D'Agostino
*Assistant Examiner* — Brandon Gray
(74) *Attorney, Agent, or Firm* — Hauptman Ham, LLP

(57) ABSTRACT

A method for verifying a request signal from a client in a Web-based game including sending a start signal of a game mission to a server; sending an acquired score and a completion time of a sub-mission of the game mission to the server, and completing the sum-mission by sending a unique key corresponding to the completion of the sub-mission to the client on the basis of the completion time and the acquired score; and sending a retransmission unique key and reward requesting information corresponding to the completion of the game mission to the server when the sub-mission is completed, and approving the completion of the game mission of the client on the basis of the retransmission unique key and information on the completion of the sub-mission. Accordingly, it is possible to prevent the client from abnormally acquiring a point or an item.

17 Claims, 4 Drawing Sheets

METHOD FOR IDENTIFYING A CLIENT'S REQUEST SIGNAL AT GAME BASED ON WEB

CROSS-REFERENCE TO RELATED APPLICATIONS

This application claims the priority of Korean Patent Application No. 2014-0021582 filed on Feb. 24, 2014 in the Korean Intellectual Property Office, the disclosure of which is incorporated herein by reference.

BACKGROUND OF THE INVENTION

1. Field of the Invention

The present invention relates to a method and a system for verifying a request signal from a client in a Web-based game, and more particularly, to a method and a system for verifying a request signal from a client in a Web-based game based on a unique key value and a minimum elapsed time required to acquire a point or an item.

2. Description of the Related Art

In recent years, as portable mobile devices such as a smartphone and a table PC easy to carry are widely used, mobile financial transactions, mobile purchases of goods, and Web-based games can be possible through wireless Internet connection anytime and anywhere.

Particularly, Apple launched a market called 'App Store.' This opens a new market that is certainly different from existing application stores for game developers or businesses, and allows users to easily purchase and use applications which are cheap and have good quality (hereinafter, referred to as app).

As well as the market for Apple-based hybrid app games, the market for Android-based hybrid app games has grown rapidly. Sales of Android-based mobile devices have already exceeded sales of the iPhones, and Android app stores have grown rapidly. Competitors such as BlackBerry and Windows Phone 7 have invested continuously in this market that will never be given up.

As a result, the development of next-generation Web standard technologies that serve as a platform for several years from now has begun, and the next-generation Web standard technologies represented by HTML5 have provided various and widespread functions more than those of any platform and added so far new functions continuously. The Web technology that supports only text, images and link services between documents provides various functions such as 2D, 3D, vector graphics, high-definition videos, sounds, high-speed synchronous protocols, databases, and JavaScript engines that are always changing to developers. Accordingly, if a browser for supporting the standard technology is developed, the best development solution that can develop high-quality apps run in various devices by using a pair of codes has been achieved.

Among hybrid app development platforms, 'Phone Gap' that is a hybrid app development framework launched early in 2009 is a technology that builds a web page designed by HTML to an iPhone app. This technology allows the user to use a camera of the iPhone, to access an address book, and to receive positional information of a GPS sensor through JavaScript in addition to uploading HTML to the App Store.

In most hybrid app games, the users have made abnormal attempts to acquire a certain point or a certain item in a short time. Particularly, a hybrid application in which the user can check all sources in the game has weak security in communication with the server, unlike existing PC application-based games.

[Patent Literature 1] Korean Patent Publication No. 2013-0017337

[Patent Literature 2] Korean Patent Publication No. 2013-0106976

SUMMARY OF THE INVENTION

An object of the present invention is to provide a method and a system for verifying a request signal from a client in a Web-based game based on a unique key value and a minimum elapsed time required to prevent a client from abnormally acquiring a point or an item.

According to an aspect of the present invention, there is provided a method for verifying a request signal from a client in a Web-based game. The method includes sending, by a client, a start signal of a game mission to a server; sending, by the client, an acquired score and a completion time of a sub-mission of the game mission to the server, and completing, by the server, the sum-mission by sending a unique key corresponding to the completion of the sub-mission to the client on the basis of the completion time and the acquired score; and sending, by the client, a retransmission unique key and reward requesting information corresponding to the completion of the game mission to the server when the sub-mission is completed, and approving, by the server, the completion of the game mission of the client on the basis of the retransmission unique key and information on the completion of the sub-mission.

The completing the sub-mission may include comparing, by the server, a preset reference score and a preset reference time with the acquired score and the completion time of the sub-mission, and sending, by the server, the unique key corresponding to the completion of the sub-mission to the client when the completion time is greater than the reference time and the acquired score satisfies the reference score; and comparing, by the server, the preset reference score and the preset reference time with the acquired score and the completion time of the sub-mission, and completing, by the server, the sub-mission by determining that the sub-mission is abnormally completed when the completion time is not greater than the reference time or the acquired score does not satisfy the reference score.

In the completing the sub-mission, when the client completes abnormally the same sub-mission more than a preset reference number of times, the server may inhibit the client from carrying out the same sub-mission.

In the completing the sub-mission, when the client completes abnormally the sub-mission, the server may inhibit the client from carrying out the same sub-mission within a preset period of time.

In the completing the game mission, when the acquired score and the completion time of the sub-mission satisfy the reference score and the reference time and the unique key and the retransmission unique key are the same, the server may determine that the client acquires an item or a point.

The acquired score may be a point obtained when a main character of the game mission passes through a predetermined region or experiences a predetermined event.

The unique key may include a client ID, a serial number, and a date and a time on which the sub-mission is carried out, and the reward requesting information may be a preset item or a preset point that is given when the game mission is completed.

The completion time of the sub-mission may be an elapsed time for which the sub-mission is carried out, or a required time from starting the game mission to normal completion of the sub-mission.

According to another aspect of the present invention, there is provided a system for verifying a request signal from a client in a Web-based game. The system includes a client that sends a start signal of a game mission, and an acquired score and a completion time of a sub-mission of the game mission, and sends a retransmission unique key and reward requesting information corresponding to the completion of the game mission when the game mission is completed; and a server that receives the completion time and the acquired score, compares the received completion time and the acquired score with a preset reference time and a preset reference score, sends a unique key corresponding to the completion of the sub-mission to the client depending on the compassion result, and approves the completion of the game mission of the client on the basis of information on the completion of the sub-mission and the retransmission unique key when the reward requesting information is received.

The server may compare the preset reference score and the preset reference time with the acquired score and the completion time of the sub-mission, and send the unique key corresponding to the completion of the sub-mission to the client when the completion time is greater than the reference time and the acquired score satisfies the reference score.

The server may compare the preset reference score and the preset reference time with the acquired score and the completion time of the sub-mission, and complete the sub-mission by determining that the sub-mission is abnormally completed when the completion time is not greater than the reference time or the acquired score does not satisfy the reference score.

When the client completes abnormally the same sub-mission more than a preset reference number of times, the server may inhibit the client from carrying out the same sub-mission.

When the acquired score and the completion time of the sub-mission satisfy the reference score and the reference time and the unique key and the retransmission unique key are the same, the server may determine that the client acquires an item or a point.

The acquired score may be a point obtained when a main character of the client passes through a predetermined region or experiences a predetermined event.

The unique key may include a client ID, a serial number, and a date and a time on which the sub-mission is carried out.

The reward requesting information may be a preset item or a preset point that is given when the game mission is completed.

The completion time of the sub-mission may be an elapsed time for which the sub-mission is carried out, or a required time from starting the game mission to normal completion of the sub-mission.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
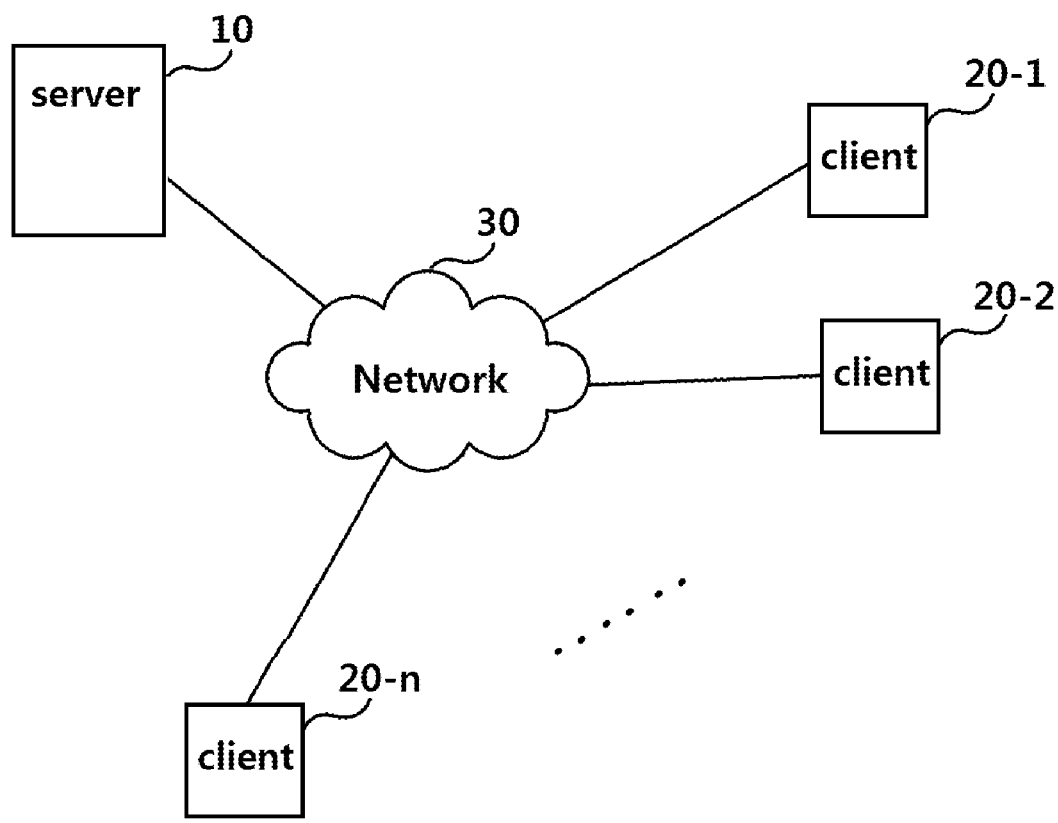
FIG. 1 is a block diagram illustrating a system for verifying a request signal from a client in a Web-based game according to an exemplary embodiment of the present invention.

Exemplary embodiments of the present invention will now be described in detail with reference to the accompanying drawings.

As set forth above, according to exemplary embodiments of the invention, in a method and a system for verifying a request signal from a client in a Web-based game, it is possible to prevent a client from abnormally acquiring a point or an item on the basis of a unique key value issued by a server and a time and score range preset by a developer in a hybrid application.

The following embodiments are proposed by combining constituent components and features of the present invention according to a predetermined format. The individual constituent components or features should be considered to be optional factors on the condition that there is no additional remark. The individual constituent components or feature may not be combined with other constituent components or characteristics. In addition, some constituent components and/or features may be combined to implement the exemplary embodiments of the present invention. The order of operations described in the exemplary embodiments of the present invention may be changed. Some constituent components or features of any exemplary embodiment may also be included in other exemplary embodiments, or may be replaced with those of the other exemplary embodiments.

The exemplary embodiments of the present invention can be implemented by a variety of means. For example, the exemplary embodiments of the present invention can be implemented by hardware, firmware, software, or a combination thereof.

In the case of implementing the present invention by hardware, methods according to the exemplary embodiments of the present invention can be implemented with one or more application specific integrated circuits (ASICs), Digital signal processors (DSPs), digital signal processing devices (DSPDs), programmable logic devices (PLDs), field programmable gate arrays (FPGAs), a processor, a controller, a microcontroller, and a microprocessor.

In the case of implementing the present invention by firmware or software, methods according to the exemplary embodiments of the present invention may be embodied in functions, processes, or modules that perform the above-described functions or operations. Software codes may be stored in a memory unit and executed by a processor. The memory unit may be positioned inside or outside the processor to transmit or receive data to or from the processor by various well-known means.

Throughout the specifications, one part being "coupled" to the other part may include a case where one part is directly connected to the other part and a case where one part is electrically connected to the other part with any element interposed therebetween. Unless defined otherwise, one part including any constituent component means not that one part excludes other constituent components but that one part may further include other constituent components.

The term "module" described in the present specifications means one unit that processes a certain function or operation, and may be implemented by hardware, software, or a combination of hardware and software.

The terminologies used herein are for the purpose of describing particular embodiments only, and may be changed to other forms without departing from the technical spirit of the present invention.

First, there will be described a process in which the present inventor has derived a method and a system for verifying a request signal from a client in a Web-based game according to an exemplary embodiment of the present invention.

In recent years, as the development of hybrid applications as a kind of Web-based games using HTML5 that is a Web-based standard has progressed, various hybrid app games have been developed. Here, the hybrid application means an application in which a web page is designed by typically using technologies such as HTML, CSS and JavaScript and only mounting a browser for displaying the web page is provided.

Since the hybrid app technology communicates with a server while HTML files are positioned within a smartphone of a user, all sources are positioned within the smartphone, and it is difficult to encode the sources due to a problem of web technology. Further, when the hybrid application within the smartphone as a client communicates with the server, the server may not verify whether or not data requested from the hybrid application is normal.

When a server page is simply provided through the hybrid application, since the corresponding service is positioned within a domain of the server, a specific request is made within the server, so that the server can defend against malicious attacks of random users.

When the HTML pages of the hybrid application are positioned in the server, since a loading speed of the application is slowed, most hybrid applications store the HTML pages in the smartphone.

However, when the HTML page is stored in the smartphone and only information within the HTML page is loaded from the server, as described above, the server may not verify whether or not the request of the client is a normal request.

Figure 2:
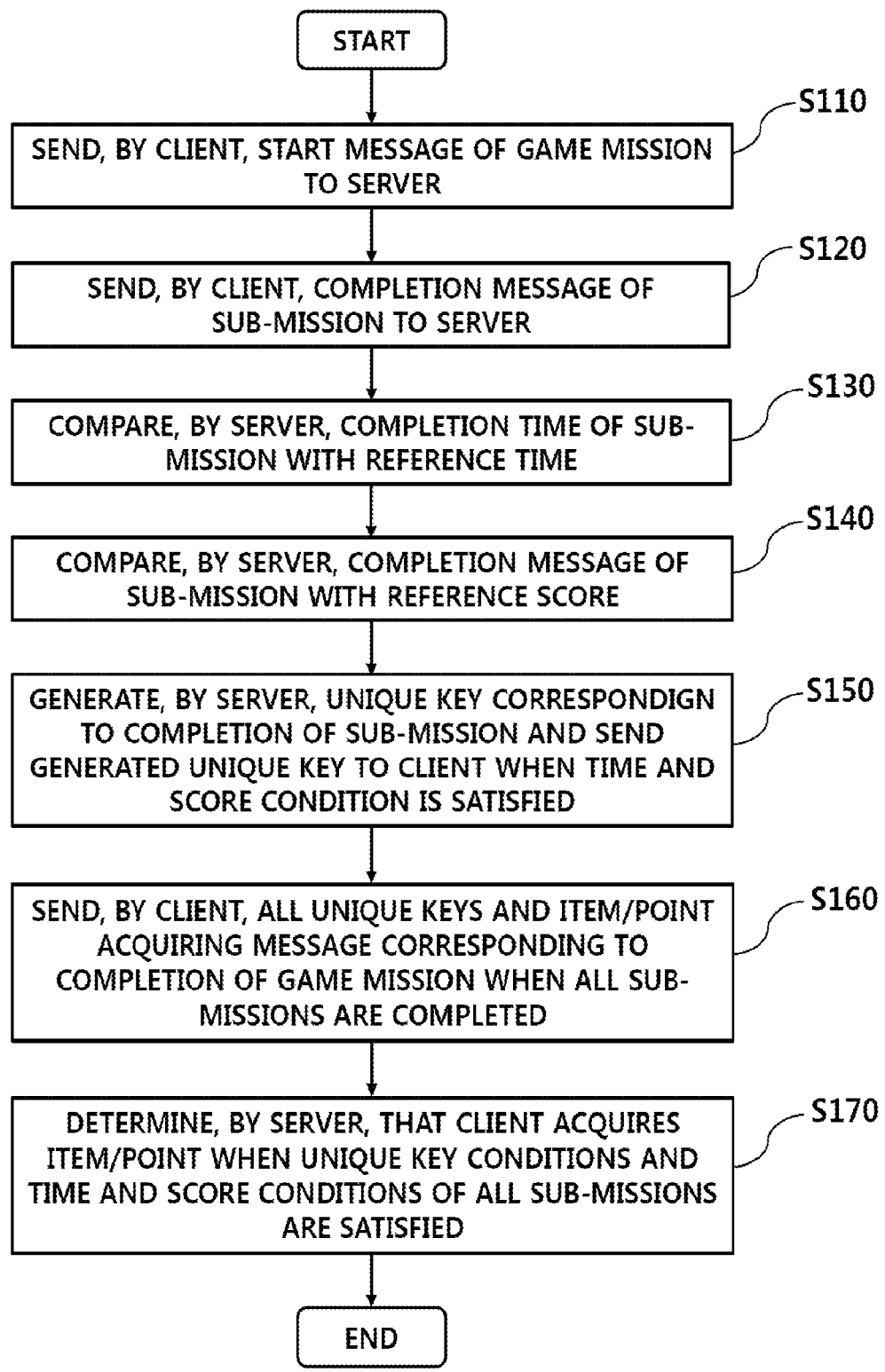
FIG. 2 is a flowchart illustrating a method for verifying a request signal from a client in a Web-based game according to an exemplary embodiment of the present invention.

FIG. 1 is a block diagram illustrating a system for verifying a request signal from a client in a Web-based game according to an exemplary embodiment of the present invention, and FIG. 2 is a flowchart illustrating a method for verifying a request signal from a client in a Web-based game according to an exemplary embodiment of the present invention.

The method and the system for verifying a request signal from a client in a Web-based game according to the exemplary embodiment of the present invention will be described in detail with reference to FIGS. 1 and 2.

Referring to FIGS. 1 and 2, in the method for verifying a request signal from a client in a Web-based game (a hybrid app game) according to the exemplary embodiment of the present invention, before starting a game, a client 20-n of a smartphone accesses a server 10 through a network 30 and is assigned an access ID and an access unique key. When the access for the game is succeeded, the client 20-n sends a start signal of a game mission to the server 10 (S110), and the client 20-n sends an acquired score and a completion time of a sub-mission of the game mission to the server 10 (S150). The server 10 completes all sub-missions by sending unique keys corresponding to the completion of the sub-missions to the client 20-n on the basis of the completion time and the acquired score (S160). When all of the sub missions are completed, the client 20-n sends a retransmission unique key and reward requesting information corresponding to the completion of the game mission to the server 10, and the server approves the completion of the game mission of the client on the basis of the retransmission unique key and information on the completion of the sub-mission (S170).

Here, the retransmission unique key refers to a unique key that is received by the client 20-n from the server 10 when any sub-mission is successively completed and is sent to the server 10 from the client in order to acquire items and points when the game mission is completed. When the game mission is successively completed, the unique key created by the server 10 and the retransmission unique key returned to the server by the client 20-n are the same for any sub-mission.

To perform each of the sub-missions, the server 10 compares a preset reference score and a preset reference time with the acquired score and the completion time of the sub-mission, respectively (S120 and S130). As the comparison result, when the completion time of the sub-mission is greater than the reference time and the acquired score satisfies the reference score, the server 10 sends the unique key corresponding to the completion of the sub-mission to the client 20-n. However, when the completion time is smaller than the reference time and the acquired score does not satisfy the reference score, the server 10 completes the sub-mission by determining that the client 20-n completes abnormally the sub-mission.

Here, when completing the sub-mission, the server may display an error code (code 400) through a pop-up window or may complete simply the sub-mission.

In the present exemplary embodiment, the acquired score is a point acquired when a main character of the game mission passes through a certain region or experiences a certain event. When the client 20-n passes through a certain region in order to carry out a mission for acquiring a certain item or a certain score or a certain event occurs, the occurred result is sent to the server 10. The unique key includes a client ID assigned to the client 20-n, a client serial number (for example, a serial number of a smartphone accessing to the server), and a date and a time on which the sub-mission is carried out. The unique key is encoded using a MD-5 or SHA-2 function to be sent to the client 20-n. The reward requesting information is an item or a point given to the client 20-n when the game mission is completed and is a value preset by a game developer within the server 10.

In the present exemplary embodiment, the acquired score satisfying the reference score means that a point acquired by the main character of the game that carries out the sub-mission of the game mission is greater or smaller than a point preset by the game developer, or is a value within a certain range.

The completion time of the sub-mission may be set as an elapsed time for which the sub-mission is carried out, or a required time from starting the game mission to normal completion of the sub-mission. The completion time may be differently set depending on a game. The completion time may be set to several minutes to several tens of minutes when the completion time is set as the elapsed time, and the completion time may be set to several tens of minutes to several hours when the completion time is set as the required time.

When the client 20-n completes abnormally the same sub-mission more than a certain number of times, the server 10 may not allow the client 20-n to carry out the same sub-mission within a certain period of time, or may inhibit the client from carrying out the game.

When the client 20-n completes abnormally sub-mission, the server 10 may inhibit the client 20-n from carry out the same sub-mission within a certain period of time.

When the completion times and the acquired scores of the sub-missions carried out by the client 20-n satisfy the reference time and the reference score and the unique keys and the retransmission unique keys are the same, the server 10 determines that the client 20-n normally completes all of the sub-missions constituting the game mission, and determines that the client acquires requested items or points (S170).

FIGS. 3 to 6 illustrate processes from starting a game mission from a client to completion of any sub-mission in a hybrid app game according to an exemplary embodiment of the present invention.

Referring to FIGS. 3 to 6, there is described a process of carrying out a sub-mission of a game to which the method for verifying a request signal from a client in a Web-based game according to the exemplary embodiment of the present invention is applied.

Figure 3:
FIG. 3 illustrates a session generating screen at an access step for starting a game.

FIG. 3 illustrates a session generating screen at an access step for starting a game. That is, FIG. 3 illustrates a screen on which an event indicating that the client 20-n starts the game occurs to be sent to the server 10 through the network 30.

Figure 4:
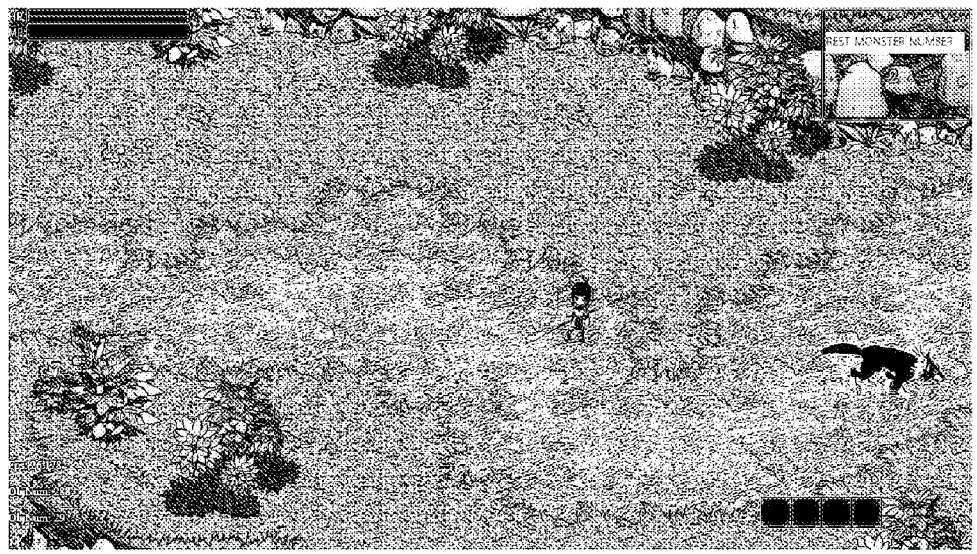
FIG. 4 illustrates a process in which an animal moves to a certain region in order to carry out a mission as any sub-mission.

FIG. 4 illustrates a process in which an animal moves to a certain region in order to carry out a mission as any sub-mission. In this case, a point is generated whenever the animal moves by a certain distance or for a certain time. The server 10 checks a time. Specifically, when a main character passes through a certain section in order to slay a monster, the corresponding event occurs to be sent to the server 10. In this case, when parameter values of the corresponding event sent to the server 10 satisfy a time and score condition for a game start time and a score preset by the developer, the server 10 sends the unique key to the client 20-n.

Figure 5:
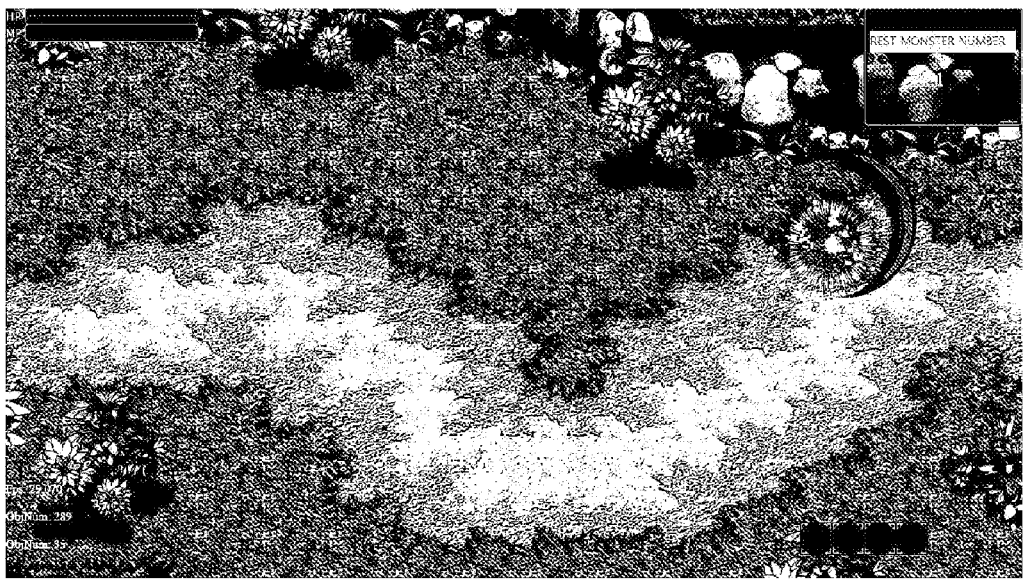
FIG. 5 illustrates an occurrence of an event indicating that the main character slays the monster.

FIG. 5 illustrates an occurrence of an event indicating that the main character slays the monster. The client 20-n sends a time and a score of the corresponding event to the server 10, and when the received score and time satisfy the score and time condition input by the developer in advance, the server 10 sends the unique key to the client 20-n. In this case, an item obtained by slaying the monster is generated on a screen of the client 20-n on which the game is played.

Figure 6:
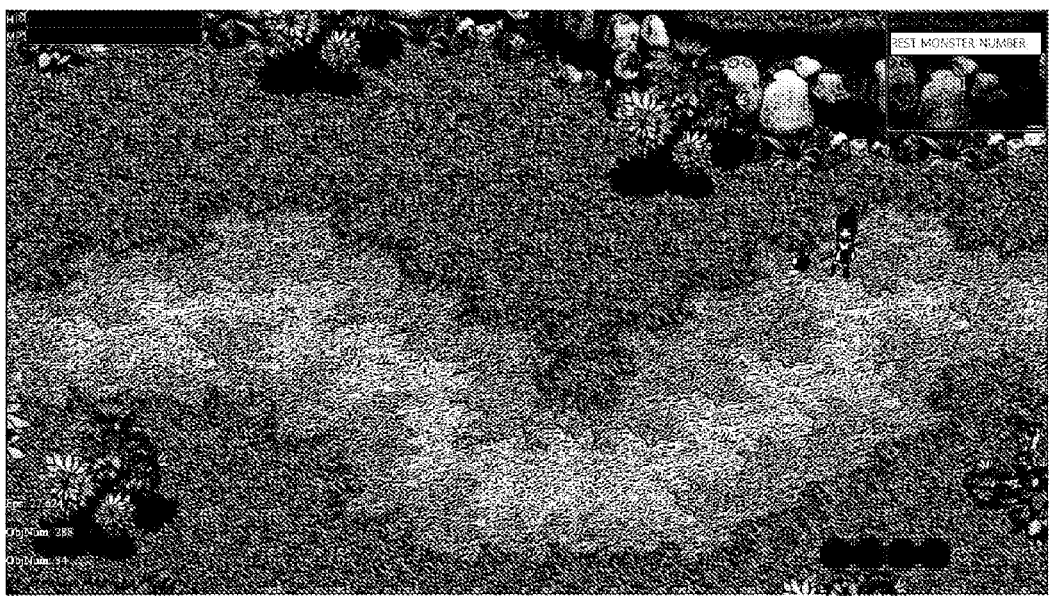
FIG. 6 illustrates a screen before the main character acquires an item obtained by completing the game mission.

FIG. 6 illustrates a screen before the main character acquires an item obtained by completing the game mission. That is, when the client 20-n completes successively all of the sub-missions, the main character can acquire the generated item.

While the above-described exemplary embodiments are merely examples of the technical scope of the present invention, it will be apparent to those skilled in the art that various modifications, variations, substitutions can be made without departing from the spirit and scope of the invention as defined by the appended claims. Accordingly, the exemplary embodiments and the accompanying drawings disclosed in the present invention are presented to describe the technical sprit of the present invention and are not intended to limit the technical sprit of the present invention. Thus, the technical sprit of the present invention is not limited to the exemplary embodiments and the accompanying drawings. The scope of the present invention should be defined by the appended claims, and all technical sprits of equivalents thereof should be interpreted as being included in the scope of the present invention. In addition, it will be apparent that embodiments may be configured by combining claims which do not have an explicit relationship therebetween or new claims may be added by amendment after application.

What is claimed is:

1. A method performed by a system for verifying a request signal from a client in a Web-based game, the system including the client and a server each implemented by one or more application specific integrated circuits (ASICs) or a processor to execute the method comprising:

sending, by the client, a start signal of a game mission to the server;

sending, by the client, an acquired score and a completion time of a sub-mission of the game mission to the server, and completing, by the server, the sum-mission by sending a unique key corresponding to the completion of the sub-mission to the client on the basis of the completion time and the acquired score; and sending, by the client, a retransmission unique key and reward requesting information corresponding to the completion of the game mission to the server when the sub-mission is completed, and approving, by the server, the completion of the game mission of the client on the basis of the retransmission unique key and information on the completion of the sub-mission, wherein the completing the sub-mission includes:

comparing, by the server, a preset reference score and a preset reference time with the acquired score and the completion time of the sub-mission, and sending, by the server, the unique key corresponding to the completion of the sub-mission to the client when the completion time is greater than the reference time and the acquired score satisfies the reference score; and comparing, by the server, the preset reference score and the preset reference time with the acquired score and the completion time of the sub-mission, and completing, by the server, the sub-mission by determining that the sub-mission is abnormally completed when the completion time is not greater than the reference time or the acquired score does not satisfy the reference score.

2. The method for verifying a request signal from a client in a Web-based game of claim 1, wherein in the completing the sub-mission, when the client completes abnormally the same sub-mission more than a preset reference number of times, the server inhibits the client from carrying out the same sub-mission.

3. The method for verifying a request signal from a client in a Web-based game of claim 1, wherein in the completing the sub-mission, when the client completes abnormally the sub-mission, the server inhibits the client from carrying out the same sub-mission within a preset period of time.

4. The method for verifying a request signal from a client in a Web-based game of claim 1, wherein in the completing the game mission, when the acquired score and the completion time of the sub-mission satisfy the reference score and the reference time and the unique key and the retransmission unique key are the same, the server determines that the client acquires an item or a point.

5. The method for verifying a request signal from a client in a Web-based game of claim 1, wherein the acquired score is a point obtained when a main character of the game mission passes through a predetermined region or experiences a predetermined event.

6. The method for verifying a request signal from a client in a Web-based game of claim 1, wherein the unique key includes a client ID, a serial number, and a date and a time on which the sub-mission is carried out, and the reward requesting information is a preset item or a preset point that is given when the game mission is completed.

7. The method for verifying a request signal from a client in a Web-based game of claim 6, wherein the unique key is encoded to be sent to the client.

8. The method for verifying a request signal from a client in a Web-based game of claim 1, wherein the completion time of the sub-mission is an elapsed time for which the sub-mission is carried out, or a required time from starting the game mission to normal completion of the sub-mission.

9. The method for verifying a request signal from a client in a Web-based game of claim 1, wherein the Web-based game is a hybrid app game.

10. A system for verifying a request signal from a client in a Web-based game, the system comprising:
   a client, implemented by one or more application specific integrated circuits (ASICs) or a processor, configured to send a start signal of a game mission, and an acquired score and a completion time of a sub-mission of the game mission, and sends a retransmission unique key and reward requesting information corresponding to the completion of the game mission when the game mission is completed; and
   a server, implemented by one or more application specific integrated circuits (ASICs) or a processor, configured to receive the completion time and the acquired score, compares the received completion time and the acquired score with a preset reference time and a preset reference score, sends a unique key corresponding to the completion of the sub-mission to the client depending on the compassion result, and approves the completion of the game mission of the client on the basis of information on the completion of the sub-mission and the retransmission unique key when the reward requesting information is received,
   wherein the server compares the preset reference score and the preset reference time with the acquired score and the completion time of the sub-mission, and sends the unique key corresponding to the completion of the sub-mission to the client when the completion time is greater than the reference time and the acquired score satisfies the reference score, and
   wherein the server compares the preset reference score and the preset reference time with the acquired score and the completion time of the sub-mission, and completes the sub-mission by determining that the sub-mission is abnormally completed when the completion time is not greater than the reference time or the acquired score does not satisfy the reference score.

11. The system for verifying a request signal from a client in a Web-based game of claim 10, wherein when the client completes abnormally the same sub-mission more than a preset reference number of times, the server inhibits the client from carrying out the same sub-mission.

12. The system for verifying a request signal from a client in a Web-based game of claim 10, wherein when the client completes abnormally the sub-mission, the server inhibits the client from carrying out the same sub-mission within a predetermined period of time.

13. The system for verifying a request signal from a client in a Web-based game of claim 10, wherein when the acquired score and the completion time of the sub-mission satisfy the reference score and the reference time and the unique key and the retransmission unique key are the same, the server determines that the client acquires an item or a point.

14. The system for verifying a request signal from a client in a Web-based game of claim 10, wherein the acquired score is a point obtained when a main character of the game mission passes through a predetermined region or experiences a predetermined event.

15. The system for verifying a request signal from a client in a Web-based game of claim 10,
   wherein the unique key includes a client ID, a serial number, and a date and a time on which the sub-mission is carried out, and
   the reward requesting information is a preset item or a preset point that is given when the game mission is completed.

16. The system for verifying a request signal from a client in a Web-based game of claim 10, wherein the completion time of the sub-mission is an elapsed time for which the sub-mission is carried out, or a required time from starting the game mission to normal completion of the sub-mission.

17. The system for verifying a request signal from a client in a Web-based game of claim 10, wherein the Web-based game is a hybrid app game.

* * * * *